(12) United States Patent
Groenewolt et al.

(10) Patent No.: US 9,404,011 B2
(45) Date of Patent: Aug. 2, 2016

(54) COATING AGENTS HAVING IMPROVED RUNOFF TENDENCY

(75) Inventors: Matthijs Groenewolt, Münster (DE); Manuela Niemeier, Drensteinfurt (DE)

(73) Assignee: BASF Coatings GmbH, Munster (DE)

( * ) Notice: Subject to any disclaimer, the term of this patent is extended or adjusted under 35 U.S.C. 154(b) by 452 days.

(21) Appl. No.: 13/642,630

(22) PCT Filed: Mar. 30, 2011

(86) PCT No.: PCT/EP2011/054921
§ 371 (c)(1),
(2), (4) Date: Jan. 14, 2013

(87) PCT Pub. No.: WO2011/131461
PCT Pub. Date: Oct. 27, 2011

(65) Prior Publication Data
US 2013/0196072 A1    Aug. 1, 2013

(30) Foreign Application Priority Data
Apr. 21, 2010  (DE) .......................... 10 2010 015 675

(51) Int. Cl.
| | |
|---|---|
| *B05D 1/02* | (2006.01) |
| *B05D 1/04* | (2006.01) |
| *B05D 7/14* | (2006.01) |
| *B05D 7/26* | (2006.01) |
| *C08G 18/28* | (2006.01) |
| *C08G 18/62* | (2006.01) |
| *C08G 18/79* | (2006.01) |
| *C08G 18/80* | (2006.01) |
| *C09D 133/14* | (2006.01) |
| *C09D 175/04* | (2006.01) |
| *C09D 175/12* | (2006.01) |

(52) U.S. Cl.
CPC ................ *C09D 133/14* (2013.01); *B05D 1/02* (2013.01); *B05D 1/04* (2013.01); *B05D 7/14* (2013.01); *B05D 7/26* (2013.01); *C08G 18/289* (2013.01); *C08G 18/6254* (2013.01); *C08G 18/792* (2013.01); *C08G 18/809* (2013.01); *C09D 175/04* (2013.01); *C09D 175/12* (2013.01)

(58) Field of Classification Search
CPC .. C09D 133/14; C09D 175/04; C09D 175/12; C08G 18/289; C08G 18/6254; C08G 18/792; C08G 18/809; B05D 1/02; B05D 1/04; B05D 7/14; B05D 7/26
USPC .......... 427/372.2, 385.5, 402, 407.1; 428/423.1, 447; 524/588, 589; 528/25, 528/28, 38
See application file for complete search history.

(56) References Cited

U.S. PATENT DOCUMENTS

| | | | |
|---|---|---|---|
| 4,311,622 A | 1/1982 | Buter | |
| 4,710,542 A | 12/1987 | Forgione et al. | |
| 5,516,559 A | 5/1996 | Rockrath et al. | |
| 5,716,678 A | 2/1998 | Rockrath et al. | |
| 6,855,792 B2 | 2/2005 | Speier et al. | |
| 7,419,564 B2 | 9/2008 | Henke et al. | |
| 8,013,099 B2 | 9/2011 | Poppe et al. | |
| 8,679,589 B2 * | 3/2014 | Groenewolt et al. | ......... 427/387 |
| 8,790,752 B2 * | 7/2014 | Groenewolt et al. | ...... 427/372.2 |

(Continued)

FOREIGN PATENT DOCUMENTS

| | | |
|---|---|---|
| DE | 2751761 A1 | 6/1978 |
| DE | 10060327 A1 | 6/2002 |

(Continued)

OTHER PUBLICATIONS

English Translation of International Preliminary Report on Patentability for International Application No. PCT/EP2011/054921 issued Oct. 23, 2012, 9 pages.
Römpp Lexikon "Lacke und Druckfarben" Georg Thieme Verlag, Stuttgart, 1998, pp. 250 to 252.
Machine translation of Römpp Lexikon "Lacke und Druckfarben" Georg Thieme Verlag, Stuttgart, 1998, pp. 250 to 252.

(Continued)

*Primary Examiner* — Patrick Niland
(74) *Attorney, Agent, or Firm* — Servilla Whitney LLC

(57) ABSTRACT

Coating compositions comprising at least one hydroxyl-containing compound (A), at least one isocyanato-containing compound (B) and at least one urea-group-containing compound (H) different from (B), compound (H) comprising at least one structural unit selected from the group consisting of a structural unit (I)

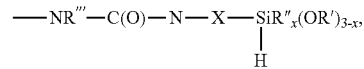

a structural unit (II)

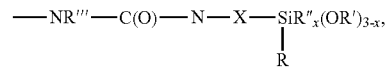

a structural unit (III)
—NR'''—C(O)—N(X—SiR''$_x$(OR')$_{3-x}$)$_n$(X'—SiR''$_y$(OR')$_{3-y}$)$_m$, and combinations of two or more of the foregoing, compound (H) being obtained by reacting an isocyanato-containing compound (H$_G$) with amino-containing compounds, wherein in compound (H) more than 90 mol % of the isocyanate groups originally present in (H$_G$) have undergone reaction to form the structural units (I), (II), (III), or combinations thereof, where R', R'''=hydrogen, alkyl, cycloalkyl, aryl or aralkyl; R, R''=alkyl, cycloalkyl, aryl or aralkyl; X, X'=linear and/or branched alkyl or cycloalkyl radical; x, y, n, m=0 to 2; and m+n=2.

15 Claims, No Drawings

(56) References Cited

U.S. PATENT DOCUMENTS

| | | | |
|---|---|---|---|
| 8,808,805 B2 * | 8/2014 | Groenewolt et al. | 427/385.5 |
| 9,017,818 B2 * | 4/2015 | Groenewolt | 428/423.1 |
| 2003/0027921 A1 | 2/2003 | Speier et al. | |
| 2010/0028544 A1 * | 2/2010 | Groenewolt et al. | 427/384 |
| 2011/0045190 A1 | 2/2011 | Groenewolt et al. | |
| 2011/0059251 A1 | 3/2011 | Poppe et al. | |
| 2012/0100380 A1 * | 4/2012 | Groenewolt | 428/423.1 |
| 2014/0023789 A1 * | 1/2014 | Groenewolt et al. | 427/379 |
| 2014/0065313 A1 * | 3/2014 | Groenewolt et al. | 427/387 |

FOREIGN PATENT DOCUMENTS

| | | |
|---|---|---|
| DE | 10344448 A1 | 4/2005 |
| DE | 102005045228 A1 | 4/2007 |
| DE | 102007061854 A1 | 6/2009 |
| EP | 0008127 B1 | 4/1982 |
| EP | 0192304 A1 | 8/1986 |
| EP | 0198519 A1 | 10/1986 |
| EP | 0245700 B1 | 11/1987 |
| EP | 0249201 A2 | 12/1987 |
| EP | 0276501 A2 | 8/1988 |
| EP | 0626888 B1 | 12/1994 |
| EP | 0692007 B1 | 1/1996 |
| EP | 0994117 A1 | 4/2000 |
| EP | 1273640 A2 | 1/2003 |
| WO | WO9422968 A1 | 10/1994 |
| WO | WO9712945 A1 | 4/1997 |
| WO | WO0109260 A1 | 2/2001 |
| WO | WO02098943 A1 | 12/2002 |
| WO | WO2005005558 A1 | 1/2005 |
| WO | WO2006042585 A1 | 4/2006 |
| WO | WO2006131314 A1 | 12/2006 |
| WO | WO2008074491 A1 | 6/2008 |
| WO | WO 2009/077180 * | 6/2009 |
| WO | WO-2009/077182 | 6/2009 |

OTHER PUBLICATIONS

B. Singh et al., "Carbamylmethylated Melamines, Novel Crosslinkers for the Coatings Industry", in Advanced Organic Coatings Science and Technology Series, 1991, pp. 193 to 207. vol. 13.

English Translation of International Search Report for International Application No. PCT/EP2011/054921 mailed Jun. 27, 2011, 3 pages.

Written Opinion for International Application No. PCT/EP2011/054921 mailed Jun. 27, 2011, 7 pages.

* cited by examiner

COATING AGENTS HAVING IMPROVED RUNOFF TENDENCY

CROSS REFERENCE TO RELATED APPLICATIONS

This application is a National Phase Application of Patent Application PCT/EP2011/054921 filed on 30 Mar. 2011, which claims priority to DE 10 2010 015 675.2 filed 21 Apr. 2010, both of which applications are hereby incorporated by reference in their entirety.

FIELD OF THE INVENTION

The present invention relates to thermally curable coating compositions based on aprotic solvents and comprising polyols (A), polyisocyanates (B), and urea-group-containing compounds (H).

BACKGROUND OF THE INVENTION

EP-A-1 273 640 describes 2K [2-component] coating compositions composed of a polyol component and a crosslinker component composed of aliphatic and/or cycloaliphatic polyisocyanates, with 0.1 to 95 mol % of the originally free isocyanate groups present having undergone reaction with bisalkoxylsilylamine. These coating compositions can be used for OEM, production-line finishing, and feature good scratch resistance in conjunction with high resistance to environmental effects. However, these coating compositions have a particularly severe postcrosslinking propensity, since the conversion on thermal curing after application is inadequate. The consequences of this for the weathering stability in particular are negative.

DE-A-100 60 327 describes 1K [1-component] coating compositions comprising, as crosslinkers, blocked isocyanates in which 1 to 90 mol % of the originally free isocyanate groups present have undergone reaction with at least one secondary 3-aminopropyl-trialkoxysilane. These modified blocked isocyanates enhance the scratch resistance of the resultant coatings. Moreover, the modified blocked isocyanates exhibit a reduced crystallization propensity and solubility improved relative to the corresponding unmodified isocyanates.

WO 08/074,491 describes thermally curable coating compositions based on aprotic solvents and comprising polyols and polyisocyanates in which some of the isocyanate groups have undergone reaction with a mixture of a bisalkoxysilylamine (Ia), preferably bis[3-(trimethoxysilyl)propyl]amine, and a monoalkoxy-silylamine (IIa), preferably N-[3-(trimethoxysilyl)-propyl]butylamine. The coating compositions lead to highly scratch-resistant and acid-resistant coatings, and coatings and paint systems, especially clearcoats, can be produced even in film thicknesses >40 μm without stress cracks appearing.

These coating compositions known from EP-A-1 273 640, DE-A-100 60 327 and WO 08/074,491 may comprise typical rheological assistants. Further details as to how the problem of the sagging propensity of the coating, which occurs at relatively high film thicknesses, can be influenced, however, are absent from the publications. Indeed, as the film thickness of a coating goes up, there is an increase in the sagging propensity F, which correlates proportionally with the third power of the film thickness and with the viscosity $$F \sim d^3/\eta$$

where d is the film thickness of the coating and η is the viscosity of the coating composition.

In order, therefore, to reduce the sagging propensity for a given film thickness, it is necessary to increase the viscosity of the coating composition. Within the industry, on the other hand, there is a requirement to achieve the desired, target film thicknesses with as few application procedures as possible, this being synonymous with an increased film thickness per application step. In the area of the automobile industry and its supplier industry, in particular, the coating compositions for the color and/or effect coatings are applied by means of spraying, and this means that the viscosity of the coating compositions at the outlet nozzle ought to be relatively low.

This required viscosity behavior on the part of the coating materials is typically brought about by adding rheological assistants to the coating compositions. Compounds which have proven to be particularly appropriate in this context include various urea derivatives, obtained, for example, by reacting 1,6-hexamethylene diisocyanate with benzylamine or with methoxypropylamine. Rheological assistants of such kinds are described in DE-A-27 51 761, in EP-A-192 304 and in EP-A-198 519, for example.

One ongoing development of these rheological assistants takes the form of urea derivatives obtained by reacting 1,6-hexamethylene diisocyanate with chiral amino acids, as is described in WO 05/005558. These urea derivatives result in improved surface quality in the resultant coatings.

Furthermore, WO02/098943 discloses coating compositions which comprise a urea-based rheological assistant obtainable by reacting a diisocyanate with a mixture of a primary and/or secondary diamine, such as ethylenediamine, for example, and a primary and/or secondary monoamine, such as n-hexylamine or methoxypropylamine, for example. The coatings obtained from these coating compositions are notable for improved optical properties. The use of amines containing silane groups for preparing the rheological assistants, however, is not described in the specification.

Finally, WO 06/131314 describes silane-modified urea derivatives and their use in silane-crosslinking inks, varnishes and coatings. These silane-modified urea derivatives are obtained by stoichiometric reaction of diisocyanates with primary or secondary aminosilanes, preferably by stoichiometric reaction of diisocyanates with primary aminosilanes.

These urea derivatives used as rheological assistants are typically precipitated in a binder or a vehicle, such as a polyacrylate resin or a polyester resin, and this material is then added to the coating composition or, in the case of 2-component coating materials, to the millbase. These rheological assistants therefore supply the coating composition with further binder, and in certain circumstances this may lead to problems, such as instances of incompatibility. Alternatively it would be necessary to prepare and stock a large number of different rheological assistants each with binders adapted to the particular coating compositions.

Furthermore, in coating compositions which are baked at low temperatures of not more than 90° C., the only urea derivatives which can be used are those referred to as transparent urea derivatives, since the opaque types lead to paint film clouding. Finally, more particularly, the more innovative rheological assistants, resulting in improved properties, are decidedly expensive products.

The problem addressed by the present invention was therefore that of providing coating compositions which ought to have an improved sagging propensity even without the use of known rheological assistants, such as those based on urea derivatives, i.e., which ought to be able to be applied even at relatively high film thicknesses >40 μm, more particularly >50 μm, without runs with a length of >=1 cm occurring. The coating compositions ought to lead, even when cured at low temperatures of not more than 90° C., of the kind customary in the area of the coating of plastics parts, as for example for components for installation in or on automobiles, or in the area of automotive refinish, to coatings with a very good optical quality and with high transparency.

Furthermore, the coating compositions, depending on intended use, ought to lead to highly scratch-resistant and acid-resistant coatings. Moreover, the coatings and paint systems, especially the clearcoats, ought to be able to be produced even in film thicknesses >40 μm without stress cracks appearing. This is an essential prerequisite for the use of the coatings and paint systems, more particularly the clearcoats, in the technologically and esthetically particularly demanding sector of automotive OEM finishing. Over and above these requirements, the new coating compositions are to be producible simply and with very good reproducibility, and are not to give rise to environmental problems in the course of their application.

SUMMARY OF THE INVENTION

In the light of the problem stated above, coating compositions based on aprotic solvents have been found, comprising at least one hydroxyl-containing compound (A), at least one isocyanato-containing compound (B) different from the compound (H), and at least one urea-group-containing compound (H) different from the compound (B),
wherein
(i) the urea-group-containing compound (H) has at least one structural unit of the formula (I)

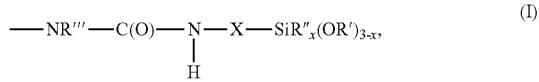

and additionally at least one other structural unit, said other structural unit being
(a) at least one structural unit (II) of the following formula (II)

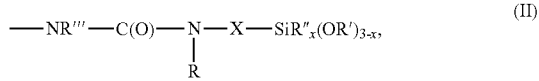

or
(b) at least one structural unit (III) of the following formula (III)

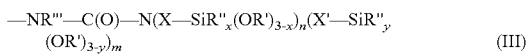

or
(c) at least one structural unit (II) of the formula (II) and at least one structural unit (III) of the formula (III), and
(ii) the urea-group-containing compound (H) is obtainable by reacting an isocyanato-containing compound (HG) with amino-containing compounds, and
(iii) in the urea-group-containing compound (H) more than 90 mol % of the isocyanate groups originally present in the isocyanato-containing compound (HG) have undergone reaction to form the structural units (I) and (II) or (I) and (III) or (I) and (II) and (III), where, in the formulae (I), (II), and (III)

R'''=hydrogen, alkyl, cycloalkyl, aryl or aralkyl, it being possible for the carbon chain to be interrupted by nonadjacent oxygen, sulfur or NRa groups, with Ra=alkyl, cycloalkyl, aryl or aralkyl,
R, R''=alkyl, cycloalkyl, aryl or aralkyl, it being possible for the carbon chain to be interrupted by nonadjacent oxygen, sulfur or NRa groups, with
Ra=alkyl, cycloalkyl, aryl or aralkyl,
R'=hydrogen, alkyl or cycloalkyl, it being possible for the carbon chain to be interrupted by nonadjacent oxygen, sulfur or NRa groups,
X, X'=linear and/or branched alkyl or cycloalkyl radical having 1 to 20 carbon atoms,
x=0 to 2, y=0 to 2, and n=0 to 2, m=0 to 2, m+n=2.

In light of the prior art it was surprising and unforeseeable for the skilled worker that the problems on which the present invention was based could be solved by means of the coating composition of the invention based on aprotic solvents.

Hence it is surprising in particular that, even without the addition of known rheological assistants based on urea derivatives, the coating compositions of the invention exhibit an improved sagging propensity, i.e., can be applied even at relatively high film thicknesses >40 μm, more particularly >50 μm, without occurrence of runs having a length of >=1 cm. Indeed, where the compounds that contain silane groups have only—as described in WO 2008/074491—the structural units (II) and/or (III), but not simultaneously the structural units (I) as well, the corresponding coating compositions exhibit Newtonian flow behavior and no structural viscosity. In order to obtain a structural viscosity in that case it is necessary to add rheological assistants that are typically employed.

The rheological assistants typically employed, however, are known to be prepared by reaction of isocyanates with amines, such as benzylamine or methoxypropylamine, in the presence of binders, since without the accompanying use of the binders in the preparation of the rheological assistants there may otherwise be gelling of the batches. As a result of these rheological assistants, therefore, the coating composition is supplied with additional binder, and in certain circumstances this may lead to problems, such as instances of incompatibility. Alternatively, it would be necessary to produce and hold in stock a large number of different rheological assistants, each with binders tailored to the particular coating compositions. The compounds (H) used in accordance with the invention, in contrast, can be produced without problems even without binders, and hence can be employed in a multiplicity of coating compositions without problems occurring such as instances of incompatibility.

The compounds (H) used in accordance with the invention exhibit, surprisingly, good rheological activity and can be incorporated effectively into a wide variety of different coating compositions.

It is surprising, furthermore, that the coating compositions, even when cured at low temperatures of not more than 90° C., as are customary in the field of the coating of plastics parts, as for example for components for installation in or on automobiles, or in the field of automotive refinish, leads to coatings having very good optical quality and having high transparency.

Furthermore, the coating compositions of the invention can be used to obtain coatings whose scratch resistance and acid resistance can be tailored to the particular end use.

Furthermore, the coatings and paint systems, especially the clearcoats, of the invention can be produced even at film thicknesses >40 μm without stress cracks occurring. Accordingly, the coatings and paint systems of the invention, especially the clearcoats, can be employed in the technologically and esthetically particularly demanding field of automotive OEM finishing.

The components according to the invention, lastly, can be produced particularly easily and with very good reproducibility, and do not give rise to any significant toxicological or environmental problems at the coating-material application stage.

DETAILED DESCRIPTION OF AN EMBODIMENT OF THE INVENTION

The Inventively Essential Urea-Group-Containing Compound (H)

For controlling the rheological properties and obtaining structural viscosity in the coating compositions based on aprotic solvents it is essential to the invention that the coating compositions comprise at least one urea-group-containing compound (H) which is different from the compound (B), where
(i) the urea-group-containing compound (H) has at least one structural unit of the formula (I)

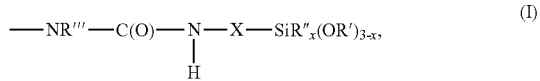

and additionally at least one other structural unit, said other structural unit being
(a) at least one structural unit (II) of the following formula (II)

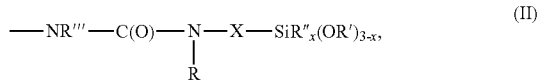

or
(b) at least one structural unit (III) of the following formula (III)

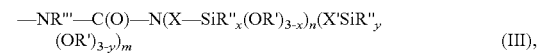

or
(c) at least one structural unit (II) of the formula (II) and at least one structural unit (III) of the formula (III), and
(ii) the urea-group-containing compound (H) is obtainable by reacting an isocyanato-containing compound (HG) with amino-containing compounds, and
(ii) in the urea-group-containing compound (H) more than 90 mol % of the isocyanate groups originally present in the isocyanato-containing compound (HG) have undergone reaction to form the structural units (I) and (II) or (I) and (III) or (I) and (II) and (III), where, in the formulae (I), (II), and (III) R'''=hydrogen, alkyl, cycloalkyl, aryl or aralkyl, it being possible for the carbon chain to be interrupted by nonadjacent oxygen, sulfur or NRa groups, with Ra=alkyl, cycloalkyl, aryl or aralkyl, preferably R'''=hydrogen or alkyl, more particularly having 1 to 6 carbon atoms, more preferably R'''=hydrogen,
R=alkyl, cycloalkyl, aryl or aralkyl, it being possible for the carbon chain to be interrupted by nonadjacent oxygen, sulfur or NRa groups, with Ra=alkyl, cycloalkyl, aryl or aralkyl, preferably R=alkyl radical or cycloalkyl radical, more particularly having 1 to 6 carbon atoms,
R'=hydrogen, alkyl or cycloalkyl, it being possible for the carbon chain to be interrupted by nonadjacent oxygen, sulfur or NRa groups, with Ra=alkyl, cycloalkyl, aryl or aralkyl, preferably R'=alkyl radical, more particularly having 1 to 6 C atoms, especially R'=ethyl and/or methyl,
X, X'=linear and/or branched alkyl or cycloalkyl radical having 1 to 20 carbon atoms, preferably X=alkyl radical having 1 to 4 carbon atoms,
R''=alkyl, cycloalkyl, aryl or aralkyl, it being possible for the carbon chain to be interrupted by nonadjacent oxygen, sulfur or NRa groups, with Ra=alkyl, cycloalkyl, aryl or aralkyl, preferably R''=alkyl radical, more particularly having 1 to 6 C atoms,
x=0 to 2, y=0 to 2, and n=0 to 2, m=0 to 2, m+n=2, where x, y, n and m are, more particularly, elements from among the host of positive integral numbers.

Through the inventive combination of the structural units (I) with the structural units (II) and/or (III) in the compound (H) success is achieved, surprisingly, in providing coating compositions which even without addition of typical rheological assistants are structurally viscous, whereas coating compositions which have only the structural units (II) and/or (III), but not (I), do not exhibit structural viscosity. Through the use of the compounds (H), therefore, success is achieved, in accordance with the invention, in setting the rheology of a large number of coating compositions.

In the coating compositions of the invention it is preferred to use compounds (H) which have at least one structural unit of the formula (I) and at least one structural unit of the formula (II) and at least one structural unit of the formula (III).

It is likewise preferred to use compounds (H) in which more than 95 mol %, more particularly at least 98 mol %, and with particular preference 100 mol %, of the isocyanate groups originally present in the isocyanato-containing compound (H$_G$) have undergone reaction to form the structural units (I) and (II) or (I) and (III) or (I) and (II) and (III).

The targeted adjustment of the amounts of the structural units (I), (II) and/or (III) in the compound (H), in particular, makes it possible easily and problemlessly to set the scratch resistance, weathering stability, and, in particular, rheology properties required for the particular end use envisaged for the coating compositions.

Preference here is given more particularly to coating compositions in which the compound (H)
has between 10 and 60 mol %, more particularly between 20 and 50 mol %, most preferably 30 to 50 mol %, based in each case on the entirety of the structural units (I), (II), and (III), of at least one structural unit of the formula (I), and
the sum of the structural units (II) plus the structural units (III) is between 90 and 40 mol %, more particularly between 80 and 50 mol %, most preferably between 70 and 50 mol %, based in each case on the entirety of the structural units (I), (II), and (III).

The compounds (H) used in the coating compositions of the invention are more particularly obtainable by reacting an isocyanato-containing compound (H$_G$)
with a primary monoalkoxysilylamine (Ia) of the formula (Ia)

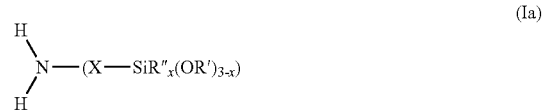

and
with a secondary monoalkoxysilylamine (IIa) of the formula (IIa)

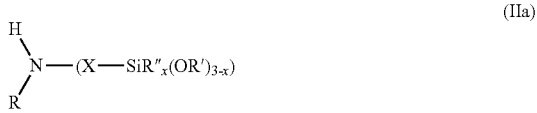

and/or
with a bisalkoxysilylamine (IIIa) of the formula (IIIa)

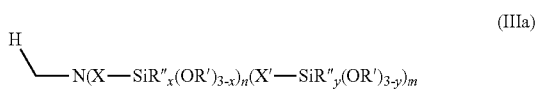

where R, R', X, X', R" x, y, m and n are as defined above.

Examples of suitable compounds (Ia) are primary aminoalkylalkoxysilanes such as, for example, 2-aminoethyltrimethoxysilane, 2-aminoethyltriethoxysilane, 3-aminopropyltrimethoxysilane, 3-aminopropyltriethoxysilane, 4-aminobutyltrimethoxysilane and/or 4-aminobutyltriethoxysilane. Particularly preferred are 3-aminopropyltrimethoxysilane and 3-aminopropyltriethoxysilane.

Examples of suitable compounds (IIa) are secondary aminoalkylalkoxysilanes such as, for example, N-(2-(trimethoxysilyl)ethyl)alkylamines, N-(3-(trimethoxysilyl)propyl)alkylamines, N-(4-(trimethoxysilyl)butyl)alkylamines, N-(2-(triethoxysilyl)ethyl)alkylamines, N-(3-(triethoxysilyl)propyl)alkylamines and/or N-(4-(triethoxysilyl)butyl)alkylamines. Particularly preferred are N-(3-(triethoxysilyl)propyl)butylamine and N-(3-(trimethoxysilyl)propyl)butylamine.

Examples of suitable compounds (IIIa) are bisalkoxysilylamines such as, for example, bis(2-ethyltrimethoxysilyl)amine, bis(3-propyltrimethoxysil-yl)amine, bis(4-butyltrimethoxysilyl)amine, bis(2-ethyltriethoxysilyl)amine, bis(3-propyltriethoxy-silyl)amine and/or bis(4-butyltriethoxysilyl)amine. Especially preferred is bis(3-propyl-trimethoxysilyl)amine.

Suitable aminosilanes (Ia), (IIa), and (IIIa) are available, for example, under the brand names DYNASYLAN® from DEGUSSA, Rheinfelden, Geniosil® from Wacker, Burghausen, and Silquest® from OSI.

The isocyanato-containing compounds ($H_G$) are preferably conventional substituted or unsubstituted, aromatic, aliphatic, cycloaliphatic and/or heterocyclic, polyisocyanates. Examples of preferred polyisocyanates are as follows: 2,4-toluene diisocyanate, 2,6-toluene diisocyanate, diphenylmethane 4,4'-diisocyanate, diphenylmethane 2,4'-diisocyanate, p-phenylene diisocyanate, biphenyl diisocyanates, 3,3'-dimethyl-4,4'-diphenylene diisocyanate, tetramethylene 1,4-diisocyanate, hexamethylene 1,6-diisocyanate, 2,2,4-trimethylhexane 1,6-diisocyanate, isophorone diisocyanate, ethylene diisocyanate, 1,12-dodecane diisocyanate, cyclobutane 1,3-diisocyanate, cyclohexane 1,3-diisocyanate, cyclohexane 1,4-diisocyanate, methyl-cyclohexyl diisocyanates, hexahydrotoluene 2,4-diisocyanate, hexahydrotoluene 2,6-diisocyanate, hexahydrophenylene 1,3-diisocyanate, hexahydrophenylene 1,4-diisocyanate, perhydrodiphenylmethane 2,4'-diisocyanate, 4,4'-methylenedicyclohexyl diisocyanate (e.g., Desmodur® W from Bayer AG), tetramethylxylyl diisocyanates (e.g., TMXDI® from American Cyanamid), and mixtures of the aforementioned polyisocyanates.

For preparing the urea-group-containing compound (H) it is preferred to make use, as isocyanato-containing compound ($H_G$), of trimers, more particularly the isocyanurate trimers of an aliphatic and/or cycloaliphatic diisocyanate, more preferably the isocyanurate trimers of an aliphatic diisocyanate. Very particular preference is given to preparing the urea-group-containing compound (H) using, as isocyanato-containing compound (HG), the isocyanurate trimers of a linear aliphatic diisocyanate, since in this way it is possible to obtain urea-containing compounds (H) having a high rheological activity.

Particularly preferred isocyanato-containing compounds (HG) are hexamethylene 1,6-diisocyanate and 4,4'-methylenedicyclohexyl diisocyanate and their isocyanurate trimers. The especially preferred isocyanato-containing compound ($H_G$) is hexamethylene 1,6-diisocyanate and its isocyanurate trimers.

The reaction of the isocyanato-containing compounds ($H_G$) with the compounds (Ia), (IIa) and/or (IIIa) takes place preferably in an inert gas atmosphere at temperatures of not more than 70° C., preferably of not more than 60° C.

With very particular preference in this case the reaction of the isocyanato-containing compound ($H_G$) takes place with a mixture of (α) the primary monoalkoxysilylamine (Ia) of the formula (Ia) and (β) the secondary monoalkoxysilylamine (IIa) of the formula (IIa) and/or the bisalkoxysilylamine (IIIa) of the formula (IIIa), since this has proven in particular to be highly favorable in the context of preventing the gelling of the compound (H) during its preparation.

Indeed, as is known, in the reaction of primary amines with isocyanates, there is a risk of gelling, and hence the reaction is typically carried out in the presence of binders, or reactive or inert carrier materials, as described in WO 06/131314, for example. Where a mixture of the primary monoalkoxysilylamine (Ia) and the secondary monoalkoxysilylamine (IIa) and/or the bisalkoxysilylamine (IIIa) is used for preparing the compounds (B) used in accordance with the invention, no gelling occurs—surprisingly, even without conventional protective measures—and the desired structures are obtained, and hence this procedure is especially preferred.

In numerous instances it has proven particularly advantageous to prepare the compound (H) separately from the other constituents of the coating composition, in other words separately not least from the isocyanato-containing compound (B), and hence this is preferred. If component (B) has structural units (IV) and/or (V), it is also possible, though not preferred, to prepare component (H) together with component (B).

The coating compositions of the invention comprise preferably 1% to 20%, more preferably 5% to 15%, by weight, based in each case on the nonvolatile constituents of the isocyanato-containing compound (B) in the coating composition, of at least one urea-containing compound (H). In the urea-containing compound (H), based on the entirety of the NCO groups in the compound (HG), preferably between 10 and 60 mol %, more particularly between 20 and 50 mol %, of the isocyanate groups in the compound (HG) have undergone reaction to form the structural unit of the formula (I).

The Isocyanato-Containing Compounds (B)

As component (B), the coating compositions of the invention comprise one or more compounds having free, i.e., non-blocked, and/or blocked isocyanate groups. The coating compositions of the invention preferably comprise compounds (B) having free isocyanate groups. The isocyanate groups of the isocyanato-containing compounds (B) may also, however, be used in blocked form. This is preferably the case when the coating compositions of the invention are employed as one-component systems.

The di- and/or polyisocyanates serving as compounds (B) are preferably conventional substituted or unsubstituted, aromatic, aliphatic, cycloaliphatic and/or heterocyclic, diisocyanates and polyisocyanates. Examples of suitable compounds (B) are the diisocyanates and polyisocyanates already specified when describing the compound ($H_G$).

Additionally preferred compounds (B) are the dimers and trimers, more particularly the biuret dimers and the isocyanurate trimers, of the aforementioned diisocyanates.

Particularly preferred compounds (B) are hexamethylene 1,6-diisocyanate, isophorone diisocyanate, and 4,4'-methylenedicyclohexyl diisocyanate, their biuret dimers and/or isocyanurate trimers.

In another embodiment of the invention the polyisocyanates are polyisocyanate prepolymers with urethane structural units, obtained by reacting polyols with a stoichiometric excess of aforementioned polyisocyanates. Polyisocyanate prepolymers of this kind are described in U.S. Pat. No. 4,598,131, for example.

Preferably at least part of the isocyanato-containing compound (B) has at least one structural unit of the formula (IV)

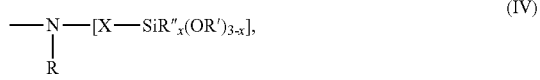

and/or at least one structural unit of the formula (V)

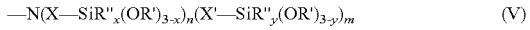

where R, R', X, X', R" x, y, m, and n are as defined above for the formulae (I), (II), and (III).

The total fraction of the isocyanate groups that have undergone reaction to form the structural units (IV) and/or (V) in the polyisocyanate compound (B) is between 0 and 90 mol %, preferably between 10 and 60 mol %, of the isocyanate groups in the polyisocyanate parent structure.

With very particular preference at least part of the isocyanato-containing compound (B) has at least one structural unit of the formula (IV) and at least one structural unit of the formula (V). In this way a broad range of different coating compositions with different, custom-tailorable properties is provided, distinguished by universal binders and a custom-tailored isocyanate component, which as and when necessary may also be combined with other crosslinking agents, such as amino resins, for example.

In the case of the isocyanato-containing compounds (B) functionalized with the structural units (IV) and (V), that are especially preferred in accordance with the invention, in the isocyanato-containing compounds (B)

between 0 and 90 mol %, preferably 10 to 60 mol %, more preferably 20 to 50 mol %, of the isocyanate groups in the polyisocyanate parent structure have undergone reaction to form the structural units (IV) and/or between 0 and 90 mol %, preferably 10 to 60 mol %, more preferably 20 to 50 mol %, of the isocyanate groups in the polyisocyanate parent structure have undergone reaction to form the structural units (V).

The inventively preferred compounds (B) functionalized with the structural units (IV) and/or (V) are prepared, in the same way as the compounds (H), more preferably by reacting some of the isocyanate groups of the compound (B) with a secondary aminoalkylalkoxysilane (IIa) of the formula (IIa)

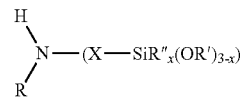

and/or
some of the isocyanate groups of the compound (B) with a secondary bisalkoxysilylamine of the formula (IIIa)

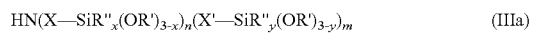

where R, R', R", X, X', and also x, y, n, and m are as defined above.

Especially preferred isocyanato-containing compounds (B) are, more particularly, reaction products of hexamethylene 1,6-diisocyanate and/or isophorone diisocyanate, and/or their isocyanurate trimers, with N-(3-(trimethoxysilyl)propyl)butylamine and bis(3-propyltrimethoxysilyl)amine.

The remaining free isocyanate groups of the isocyanato-containing compounds (B) can also be used in blocked form. This is preferably the case when the coating compositions of the invention are used as one-component systems. For the blocking it is possible in principle to use any blocking agent which can be used for blocking polyisocyanates and which has a sufficiently low deblocking temperature. Such blocking agents are very familiar to the skilled worker. It is preferred to use blocking agents of the type described in EP-A-0 626 888 and EP-A-0 692 007.

The polyisocyanate curing agent used in accordance with the invention preferably comprises at least one water scavenger, examples being reactive silanes having a greater reactivity with respect to water than isocyanates. As water scavengers it is advantageous to make use more particularly of trialkyl esters of orthoformic acid. A particularly preferred water scavenger used is triethyl orthoformate. Preference is given to adding 0.01% to 10% by weight, preferably 0.03% to 5.0% by weight, of at least one water scavenger, based on the total nonvolatiles content of the coating composition.

The Hydroxyl-Containing Compound (A)

As hydroxyl-containing compound (A) it is preferred to use low molecular mass polyols and also oligomeric and/or polymeric polyols.

Low molecular mass polyols used are, for example, diols, such as preferably ethylene glycol, neopentyl glycol, 1,2-propanediol, 2,2-dimethyl-1,3-propanediol, 1,4-butanediol, 1,3-butanediol, 1,5-pentanediol, 2,2,4-trimethyl-1,3-pentanediol, 1,6-hexanediol, 1,4-cyclohexanedimethanol, and 1,2-cyclohexanedimethanol, and also polyols, such as preferably trimethylolethane, trimethylolpropane, trimethylolhexane, 1,2,4-butane-triol, pentaerythritol and dipentaerythritol. It is preferred to admix such low molecular mass polyols in minor proportions to the oligomeric and/or polymeric polyol component (A).

The preferred oligomeric and/or polymeric polyols (A) have mass-average molecular weights Mw>500 daltons, as measured by means of GPC (gel permeation chromatography), preferably between 800 and 100 000 daltons, more particularly between 1000 and 50 000 daltons.

Particular preference is given to polyester polyols, polyurethane polyols, polysiloxane polyols, and, more particularly, polyacrylate polyols and/or polymeth-acrylate polyols, and also their copolymers, referred to below as polyacrylate polyols.

The polyols preferably have an OH number of 30 to 400 mg KOH/g, more particularly between 100 and 300 mg KOH/g.

The glass transition temperatures as measured by DSC (differential scanning calorimetry) in accordance with DIN EN ISO 11357-2 for the polyols are preferably between −150 and 100° C., more preferably between −120° C. and 80° C.

Suitable polyester polyols are described in EP-A-0 994 117 and EP-A-1 273 640, for example. It is also possible to use hydroxy-functional polyesters in which on average at least one hydroxyl function of the hydroxy-functional polyester is esterified with at least one acid selected from the group of the isomeric C8-C9 monocarboxylic acids. In particular it is possible in this way to achieve a satisfactory residual gloss in the resultant coatings. The above-described esterification with at least one C8-C9 carboxylic acid is also referred to synonymously as "acid modification".

The radical of the isomeric C8-C9 monocarboxylic acid is preferably saturated. Clearcoat compositions of this kind exhibit good weathering stability.

Particularly advantageous properties in the sense of the invention result when the radical of the C8-C9 monocarboxylic acid is the radical of octanoic acid or isononanoic acid. A particularly preferred C8-C9 monocarboxylic acid used is isononanoic acid.

For the esterification with the isomeric C8-C9 monocarboxylic acids it is preferred to use hyperbranched, dendritic hydroxy-functional polyesters. Examples of these modified hyperbranched, dendritic polyesters are described in WO-A-08/148,555, pages 4 to 8.

Polyurethane polyols are prepared preferably by reacting polyester polyol prepolymers with suitable diisocyanates or polyisocyanates and are described in EP-A-1 273 640, for example. Suitable polysiloxane polyols are described in WO-A-01/09260, for example, and the polysiloxane polyols recited therein can be employed preferably in combination with other polyols, more particularly those having relatively high glass transition temperatures.

The inventively especially preferred polyacrylate polyols are generally copolymers and preferably have mass-average molecular weights Mw of between 1000 and 20 000 daltons, more particularly between 1500 and 10 000 daltons, in each case as measured by means of gel permeation chromatography (GPC) against a polystyrene standard.

The glass transition temperature Tg of the polyacrylate polyols is generally between −100 and 100° C. The polyacrylate polyol used as component (A) preferably has a glass transition temperature Tg of less than 10° C., more preferably of −60° C. to 5° C., very preferably of −30° C. to <0° C. The glass transition temperature is determined by means of DSC measurements in accordance with DIN EN ISO 11357-2.

The polyacrylate polyols preferably have an OH number of 60 to 300 mg KOH/g, more particularly between 100 and 250 mg KOH/g, very particularly between 150 and 200 mg KOH/g.

The hydroxyl number (OH number) indicates the number of mg of potassium hydroxide equivalent to the amount of acetic acid bound by 1 g of substance on acetylation. It is determined by boiling the sample with acetic anhydride-pyridine and titrating the resultant acid against potassium hydroxide solution (DIN 53240-2).

The polyacrylate polyols (A) preferably have an acid number of between 0 and 30 mg KOH/g. The acid number here indicates the number of mg of potassium hydroxide consumed in neutralizing 1 g of the respective compound of component (b) (DIN EN ISO 2114).

Hydroxyl-containing monomer units used are preferably hydroxyalkyl acrylates and/or hydroxyalkyl methacrylates, such as, more particularly, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate 3-hydroxybutyl acrylate, 3-hydroxybutyl methacrylate, and, in particular, 4-hydroxybutyl acrylate and/or 4-hydroxybutyl methacrylate.

As further monomer units for the polyacrylate polyols it is preferred to use alkyl acrylates and/or alkyl methacrylates, such as, preferably, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, amyl acrylate, amyl methacrylate, hexyl acrylate, hexyl methacrylate, ethylhexyl acrylate, ethylhexyl methacrylate, 3,3,5-trimethylhexyl acrylate, 3,3,5-trimethylhexyl methacrylate, stearyl acrylate, stearyl methacrylate, lauryl acrylate or lauryl methacrylate, cycloalkyl acrylates and/or cycloalkyl methacrylates, such as cyclopentyl acrylate, cyclopentyl methacrylate, isobornyl acrylate, isobornyl methacrylate or, in particular, cyclohexyl acrylate and/or cyclohexyl methacrylate.

As further monomer units for the polyacrylate polyols it is possible to use vinylaromatic hydrocarbons, such as vinyltoluene, alpha-methylstyrene or, more particularly, styrene, amides or nitriles of acrylic or methacrylic acid, vinyl esters or vinyl ethers, and also, in minor amounts, more particularly acrylic acid and/or methacrylic acid.

In another embodiment of the invention the hydroxyl-containing compound (A) may have, in addition to the hydroxyl groups, structural units of the formulae (IV) and/or (V).

Structural units of the formula (V) may be introduced into the compound (A) by means for example of incorporation of monomer units having such structural units, or by means of reaction of polyols having other functional groups with a bissilane of the above formula (IIIa), the substituents being as defined above.

Structural units of the formula (IV) may be introduced into the compound (A) by means for example of incorporation of monomer units having such structural units or by means of reaction of polyols having other functional groups with a monosilane of the above formula (IIa).

Preferably, however, component (A) contains no structural units of the formula (IV) and no structural units of the formula (V).

The Combination of Components A and B, and Other Components of the Coating Composition The weight fraction of the hydroxyl-containing compounds A to be used, based on the weight fraction of the isocyanato-containing compounds B, is dependent on the hydroxyl equivalent weight of the polyol and on the equivalent weight of the free isocyanate groups of the polyisocyanate B.

The coating compositions of the invention comprise preferably between 2.5% and 97.5%, more preferably between 5% and 95%, very preferably between 10% and 90%, and more particularly between 20% and 80%, by weight, based on the amount of nonvolatile substances in the coating composition of the hydroxyl-containing compounds (A), and preferably between 2.5% and 97.5%, more preferably between 5% and 95%, very preferably between 10% and 90%, and more particularly between 20% and 80%, by weight, based on the amount of nonvolatile substances in the coating composition, of the isocyanato-containing compounds (B).

In order to ensure further-improved resistance properties on the part of the coatings of the invention toward cracking under UV radiation and wet/dry cycling in the CAM180 test (to DIN EN ISO 11341 February 1998 and DIN EN ISO 4892-2 November 2000) in combination with a high scratch resistance directly following the thermal cure, a high gloss, and high gloss retention after weathering, it is additionally preferred to select the level of structural units (II), (III), (IV) and/or (V) to be at most such that the coating compositions of the invention contain less than 6.5% by mass of Si of the structural units (II), (III), (IV) and/or (V), very preferably not more than 6.0% by mass of Si of the structural units (II), (III), (IV) and/or (V), based in each case on the solids content of the coating compositions. The silane content in % by mass of Si is determined arithmetically from the amounts of the compounds with the structural units (II), (III), (IV) and (V) used or the compounds (IIa) and (IIIa).

In another embodiment of the invention the structural elements (IV) and/or (V) may also be part of one or more further components (C), which are different from components (A) and (B), it being necessary to apply the criteria identified above.

Generally speaking, such components (C) are used in fractions of up to 40%, preferably of up to 30%, more preferably of up to 25%, by weight, based on the nonvolatile constituents of the coating composition.

The weight fractions of the polyol A and of the polyisocyanate B are preferably selected such that the molar equivalent ratio of the unreacted isocyanate groups of the isocyanato-containing compounds (B) to the hydroxyl groups of the hydroxyl-containing compounds (A) is between 0.9:1 and 1:1.1, preferably between 0.95:1 and 1.05:1, more preferably between 0.98:1 and 1.02:1.

Where the compositions are one-component coating compositions, a selection is made of the isocyanato-containing compounds (B) whose free isocyanate groups have been blocked with the blocking agents described above.

In the case of the inventively preferred 2-component (2K) coating compositions, a film-forming component comprising the hydroxyl-containing compound (A), and also, further components, described below, is mixed conventionally with a further film-forming component, comprising the isocyanato-containing compound (B), the urea-group-containing compound (H) and, where appropriate, further of the components described below, this mixing taking place shortly before the coating composition is applied; generally speaking, the film-forming component that comprises the compound (A) comprises the catalyst and also a portion of the solvent.

Catalysts (D) used for the crosslinking of the alkoxysilyl units and also for the reaction between the hydroxyl groups of the compound (A) and the free isocyanate groups of the compound (B) may be conventional compounds. Examples are Lewis acids (electron-deficient compounds), such as, for example, tin naphthenate, tin benzoate, tin octoate, tin butyrate, dibutyltin dilaurate, dibutyltin diacetate, dibutyltin oxide, lead octoate, and also catalysts as described in WO-A-06/042585.

As catalyst (D) it is particularly preferred to use phosphorus-containing catalysts, more particularly phosphorus- and nitrogen-containing catalysts. In this context it is also possible to use mixtures of two or more different catalysts.

Examples of suitable phosphorus-containing catalysts are substituted phosphonic diesters and diphosphonate diesters, preferably from the group consisting of acyclic phosphonic diesters, cyclic phosphonic diesters, acyclic diphosphonic diesters, and cyclic diphosphonic diesters. Such catalysts are described in German patent application DE-A-102005045228 for example.

Very particular preference, however, is given to using substituted phosphoric monoesters and phosphoric diesters, preferably from the group consisting of acyclic phosphoric diesters and cyclic phosphoric diesters, more preferably amine adducts of the phosphoric monoesters and diesters. Used more particularly are the corresponding amine-blocked phosphoric esters, and, of these, preferably amine-blocked ethylhexyl phosphates and amine-blocked phenyl phosphates, very preferably amine-blocked bis(2-ethylhexyl) phosphate.

The amine of the amine adducts of the phosphoric monoesters and diesters used as catalysts (D) is preferably selected from the group of amines having a pKb value >3 and a boiling point >100° C., as is described in German patent application DE 102007061854. Particularly preferred amines used for these amine adducts of the phosphoric monoesters and diesters are cyclic tertiary amines, such as N-dimethylbenzylamine and N-methylmorpholine, more particularly bicyclic tertiary amines, especially diazabicyclooctane (DABCO).

Certain amine-blocked phosphoric acid catalysts are also available commercially (e.g., Nacure products from King Industries). An example that may be given of a particularly suitable catalyst based on amine-blocked partial ester of phosphoric acid is that known under the name Nacure 4167 from King Industries.

The catalysts (D) are used preferably in fractions of 0.01% to 20% by weight, more preferably in fractions of 0.1% to 10% by weight, based on the nonvolatile constituents of the coating composition of the invention. A lower activity on the part of the catalyst can be partially compensated by correspondingly higher quantities used.

Solvents suitable for the coating compositions of the invention are in particular those which, in the coating composition, are chemically inert toward the compounds (A) and (B) and also do not react with (A) and (B) when the coating composition is being cured. Examples of such solvents are aliphatic and/or aromatic hydrocarbons such as toluene, xylene, solvent naphtha, Solvesso 100 or Hydrosol® (from ARAL), ketones, such as acetone, methyl ethyl ketone or methyl amyl ketone, esters, such as ethyl acetate, butyl acetate, pentyl acetate or ethyl ethoxypropionate, ethers, or mixtures of the aforementioned solvents. The aprotic solvents or solvent mixtures preferably have a water content of not more than 1%, more preferably not more than 0.5%, by weight, based on the solvent.

Besides the compounds (A), (B), (C), and (D) it is possible additionally to use further binders (E), which preferably are able to react and form network points with the hydroxyl groups of the compound (A) and/or with the free isocyanate groups of the compound (B) and/or with the alkoxysilyl groups of the compounds (A), (B) and/or (C).

By way of example it is possible to use amino resins and/or epoxy resins as component (E). Suitable amino resins are the typical, known amino resins, some of whose methylol and/or methoxymethyl groups may have been defunctionalized by means of carbamate or allophanate groups. Crosslinking agents of this kind are described in U.S. Pat. No. 4,710,542 and EP-B-0 245 700 and also in the article by B. Singh and coworkers, "Carbamylmethylated Melamines, Novel Crosslinkers for the Coatings Industry", in Advanced Organic Coatings Science and Technology Series, 1991, volume 13, pages 193 to 207.

Generally speaking, such components (E) are used in fractions of up to 40%, preferably up to 30%, more preferably up to 25%, by weight, based on the nonvolatile constituents of the coating composition.

The coating composition of the invention may further comprise at least one typical, known coatings additive in effective amounts, i.e., in amounts preferably up to 30%, more preferably up to 25%, and in particular up to 20% by weight, in each case based on the nonvolatile constituents of the coating composition.

Examples of suitable coatings additives are as follows:
particularly UV absorbers;
particularly light stabilizers such as HALS compounds, benzotriazoles or oxalanilides;
free-radical scavengers;
slip additives;
polymerization inhibitors;
defoamers;
reactive diluents, of the kind which are common knowledge from the prior art, and which are preferably inert toward the —Si(OR)$_3$ groups;
wetting agentssuch as siloxanes, fluorine compounds, carboxylic monoesters, phosphoric esters, polyacrylic acids and their copolymers, or polyurethanes;
adhesion promoters such as tricyclodecane-dimethanol;
flow control agents;
film-forming assistants such as cellulose derivatives;
fillers such as, for example, nanoparticles based on silicon dioxide, aluminum oxide or zirconium oxide; for further details refer to Römpp Lexikon "Lacke and Druckfarben" Georg Thieme Verlag, Stuttgart, 1998, pages 250 to 252;
rheology control additives, such as the additives known from patents WO 94/22968, EP-A-0 276 501, EP-A-0 249 201 or WO 97/12945; crosslinked polymeric microparticles, as disclosed for example in EP-A-0 008 127; inorganic phyllosilicates such as aluminum-magnesium silicates, sodium-magnesium and sodium-magnesium-fluorine-lithium phyllosilicates of the montmorillonite type; silicas such as Aerosils; or synthetic polymers containing ionic and/or associative groups such as polyvinyl alcohol, poly(meth)acrylamide, poly(meth)acrylic acid, polyvinylpyrrolidone, styrene-maleic anhydride copolymers or ethylene-maleic anhydride copolymers and their derivatives, or hydrophobically modified ethoxylated urethanes or polyacrylates;
and/or flame retardants.

In a further embodiment of the invention the coating composition of the invention may additionally comprise further pigments and/or fillers and may serve for producing pigmented topcoats. The pigments and/or fillers employed for this purpose are known to the skilled worker.

Because the coatings of the invention produced from the coating compositions of the invention adhere excellently even to electrocoats, surface coats, basecoat systems or typical, known clearcoat systems that have already cured, they are outstandingly suitable not only for use in automotive OEM finishing but also for automotive refinish or for the modular scratchproofing of automobile bodies that have already been painted.

The coating compositions of the invention can be applied by any of the typical application methods, such as spraying, knife coating, spreading, pouring, dipping, impregnating, trickling or rolling, for example. In the course of such application, the substrate to be coated may itself be at rest, with the application equipment or unit being moved. Alternatively the substrate to be coated, in particular a coil, may be moved, with the application unit being at rest relative to the substrate or being moved appropriately.

Preference is given to employing spray application methods, such as compressed-air spraying, airless spraying, high-speed rotation, electrostatic spray application (ESTA), alone or in conjunction with hot spray application such as hot-air spraying, for example.

The applied coating compositions of the invention can be cured after a certain rest time. The rest time serves, for example, for the leveling and devolatilization of the coating films or for the evaporation of volatile constituents such as solvents. The rest time may be assisted and/or shortened by the application of elevated temperatures and/or by a reduced humidity, provided this does not entail any damage or alteration to the coating films, such as premature complete crosslinking, for instance.

The thermal curing of the coating compositions has no peculiarities in terms of method but instead takes place in accordance with the typical, known methods such as heating in a forced-air oven or irradiation with IR lamps. The thermal cure may also take place in stages. Another preferred curing method is that of curing with near infrared (NIR) radiation.

The thermal cure takes place advantageously at a temperature of 30 to 200° C., more preferably 40 to 190° C., and in particular 50 to 180° C. for a time of 1 min up to 10 h, more preferably 2 min up to 5 h, and in particular 3 min to 3 h, although longer cure times may also be employed in the case of the temperatures that are employed for automotive refinish and for the painting of parts for installation in or on the body, which are preferably between 30 and 90° C.

The coating compositions of the invention, even without the addition of known rheological assistants, are notable for improvement in the sagging propensity—that is, they can be applied even at relatively high film thicknesses >40 μm, more particularly >50 μm, without occurrence of sags with a length of ≥1 cm. Even when cured at low temperatures of not more than 90° C., of the kind customary in the field of the coating of plastic parts, as for example for components for installation in or on automobiles, or in the area of automotive refinish, the coating compositions result in coatings having very good optical quality. At the same time, the coating compositions of the invention exhibit good flow, which is of great importance especially in the area of automotive OEM finishing and of automotive refinish, and also in the coating of components for installation in or on automobiles.

The coating compositions of the invention also produce new cured coatings, especially coating systems, more particularly clearcoat systems, moldings, especially optical moldings, and self-supporting films, all of which are highly scratchproof and in particular are stable to chemicals and to weathering. The coatings and coating systems of the invention, especially the clearcoat systems, can in particular be produced even in film thicknesses >40 μm without stress cracks occurring.

For these reasons the coating compositions of the invention are of excellent suitability as decorative, protective and/or effect-imparting, highly scratchproof coatings and coating systems on bodies of means of transport (especially motor vehicles, such as motorcycles, buses, trucks or automobiles) or parts thereof; on buildings, both interior and exterior; on furniture, windows, and doors; on plastics moldings, especially CDs and windows; on small industrial parts, on coils, containers, and packaging; on white goods; on films; on optical, electrical, and mechanical components; and on hollow glassware and articles of everyday use.

The coating compositions and coating systems of the invention, especially the clearcoat systems, are employed in particular in the technologically and esthetically particularly demanding field of automotive OEM finishing and also of automotive refinish. With particular preference the coating compositions of the invention are used in multistage coating methods, particularly in methods where a pigmented basecoat film is first applied to an uncoated or precoated substrate and thereafter a film with the coating compositions of the invention is applied.

Not only water-thinnable basecoat materials but also basecoat materials based on organic solvents can be used. Suitable basecoat materials are described for example in EP-A-0 692 007 and in the documents cited there in column 3 lines 50 et seq. The applied basecoat material is preferably first dried, i.e., at least some of the organic solvent and/or water is stripped from the basecoat film in an evaporation phase. Drying is accomplished preferably at temperatures from room temperature to 80° C. Drying is followed by the application of the coating composition of the invention. Subsequently the two-coat system is baked, preferably under conditions employed for automotive OEM finishing, at temperatures from 30 to 200° C., more preferably 40 to 190° C., and in particular 50 to 180° C., for a time of 1 min up to 10 h, more preferably 2 min up to 5 h, and in particular 3 min to 3 h, although longer cure times may also be employed at the temperatures employed for automotive refinish and for the painting of parts for installation in or on the body, which are preferably between 30 and 90° C.

In a further preferred embodiment of the invention, the coating composition of the invention is used as a transparent clearcoat material for coating plastics substrates, especially transparent plastics substrates. In this case the coating compositions include UV absorbers, which in terms of amount and type are also designed for effective UV protection of the plastics substrate. The plastics substrates thus coated are used preferably as a substitute for glass components in automobile construction, the plastics substrates being composed preferably of polymethyl methacrylate or polycarbonate.

EXAMPLES

Preparation of the Poly(Meth)Acrylate Polyol A1

In a double-walled 4 l stainless-steel vessel which can be heated by means of an oil circulation thermostat and is equipped with thermometer, anchor stirrer, two dropping funnels, and reflux condenser, solvent for the polymerization is introduced as an initial charge. One of the dropping funnels is charged with the monomer mixture, while the second dropping funnel is charged with the initiator solution, comprising a suitable initiator (generally a peroxide). The initial charge is heated to a polymerization temperature of 140° C. When the polymerization temperature has been reached, the initiator feed is started first of all. 15 minutes after the beginning of the initiator feed, the monomer feed (duration: 240 minutes) is started. The initiator feed is regulated so as to continue running for 30 minutes after the end of the monomer feed. After the end of the initiator feed, the mixture is stirred at 140° C. for 2 hours more and then cooled to room temperature. The reaction mixture is subsequently adjusted with solvent (Shellsol A) to a solids content of 65% by weight.

TABLE 1

Monomer composition in parts by weight of the binder (A1)

| Component | Polyol (A1) parts by weight |
|---|---|
| Styrene | 8.0 |
| n-butyl methacrylate | 8.0 |
| Acrylic acid | 0.6 |

TABLE 1-continued

Monomer composition in parts by weight of the binder (A1)

| Component | Polyol (A1) parts by weight |
|---|---|
| 4-hydroxybutyl acrylate | 12.0 |
| 2-hydroxyethyl acrylate | 12.0 |
| n-butyl acrylate | 19.0 |

The polyacrylate polyol (A1) has a glass transition temperature, calculated using the Fox equation, of −26° C., an OH number, calculated on the basis of the amount of hydroxyl-containing monomers, of 175 mg KOH/g, and an acid number, calculated on the basis of the amount of acrylic acid, of 8-12 mg KOH/g.

A millbase component is prepared by mixing the binder (A1) with the additives and solvents indicated in table 2.

TABLE 2

Composition of the millbase component in parts by weight

| Component | Parts by weight |
|---|---|
| Binder (A1) | 65 |
| Solvesso 200[1] | 5 |
| Butyl acetate | 27 |
| Tinuvin 282[2] | 1.4 |
| Tinuvin 382[3] | 1.4 |
| Dynoadd F1[4] | 0.2 |

Key to table 2:
[1]Solvesso200 = commercial petroleum fraction available from Exxon Mobil Petroleum & Chemical
[2]Tinuvin 282 = commercial light stabilizer, available from CIBA/BASF
[3]Tinuvin 382 = commercial light stabilizer, available from CIBA/BASF
[4]Dynoadd F1 = commercial, multifunctional, surface-active additive from Hertfelder GmbH, Bielefeld

Preparation of a Curing Agent (B1) Having a Degree of Conversion of the Isocyanate Groups of c=30 Mol % and a Fraction of 10 Mol % of Monosilane Structural Units (IV) and 90 Mol % of Bissilane Structural Units (V)

A three-neck glass flask equipped with a reflux condenser and a thermometer is charged with 46.21 parts of trimerized hexamethylene diisocyanate (HDI) (Desmodur® N3300, Bayer Material Science), 28.2 parts of butyl acetate and 2.07 parts of triethyl orthoformate. With nitrogen blanketing and stirring, a mixture of 21.85 parts of bis[3-(trimethoxy-silyl)propyl]amine (Dynasylan® 1124, Degussa, Rheinfelden) and 1.67 parts of N-[-3-(trimethoxysilyl)propyl]butylamine (Dynasylan® 1189, Degussa, Rheinfelden) is metered in at a rate such that 50° C. is not exceeded. After the end of the metered addition, the reaction temperature is held at 50° C. The degree of blocking is ascertained by means of titration. The curing agent has a calculated nonvolatiles content of 70% by weight and an NCO content (solids) of 10% by weight.

Preparation of a Urea-Group-Containing Compound (H1) Having a Fraction of 45 Mol % of Primary Structural Units (I), a Fraction of 5 Mol % of Secondary Structural Units (II), and a Fraction of 50 Mol % of Bisalkoxysilylamine Structural Units (III), the Mol % Figures being Based in Each Case on the Entirety of the Structural Units (I) Plus (II) Plus (III), and Having a Degree of Conversion of the Isocyanate Groups of ($H_G$) of c=100 Mol %

A three-neck glass flask equipped with a reflux condenser and a thermometer is charged with 31.2 parts of trimerized hexamethylene diisocyanate (HDI) (Desmodur® N3600, Bayer Material Science) and 20.0 parts of solvent naphtha. With nitrogen blanketing and stirring, at 20-30° C., a mixture of 29.6 parts of bis[3-(trimethoxysilyl)propyl]amine (Dynasylan® 1124, Degussa, Rheinfelden), 2.0 parts of N-[-3-(trimethoxy-silyl)propyl]butylamine (Dynasylan® 1189, Degussa, Rheinfelden), and 17.0 parts of 3-aminopropyltriethoxysilane (Dynasylan® AMEO, Degussa, Rheinfelden) is metered in at a rate such that 40° C. is not exceeded. After the end of the metered addition, the reaction temperature is held at 20-30° C. Complete reaction of the isocyanate groups is ascertained by titration. The product is a transparent mass of high viscosity which is slightly clouded by air inclusions. The compound (H1) has a calculated nonvolatiles content of 80% by weight and an NCO content (solids) of 0% by weight.

Preparation of a Urea-Group-Containing Compound (HV1) Having Isocyanate Groups and Having a Fraction of 56 Mol % of Primary Structural Units (I), a Fraction of 6 Mol % of Secondary Structural Units (II), and a Fraction of 38 Mol % of Bisalkoxysilylamine Structural Units (III), the Mol % Figures being Based in Each Case on the Entirety of the Structural Units (I) Plus (II) Plus (III), and Having a Degree of Conversion of the Isocyanate Groups of (HG) of c=80 Mol %

A three-neck glass flask equipped with a reflux condenser and a thermometer is charged with 36.60 parts of trimerized hexamethylene diisocyanate (HDI) (Desmodur® N3600, Bayer Material Science) and 19.95 parts of solvent naphtha. With nitrogen blanketing and stirring, at 20-30° C., a mixture of 20.83 parts of bis[3-(trimethoxysilyl)propyl]amine (Dynasylan® 1124, Degussa, Rheinfelden), 2.39 parts of N-[-3-(trimethoxysilyl)propyl]butylamine (Dynasylan® 1189, Degussa, Rheinfelden), and 20.22 parts of 3-aminopropyltriethoxysilane (Dynasylan® AMEO, Degussa, Rheinfelden) is metered in at a rate such that 40° C. is not exceeded. After the end of the metered addition, the reaction temperature is held at 20-30° C. Reaction of the isocyanate groups is ascertained by titration. The product is a transparent mass of high viscosity which is slightly clouded by air inclusions. The compound (HV1) has a calculated nonvolatiles content of 80% by weight and an NCO content (solids) of 2.0% by weight.

Preparation of a Urea-Group-Containing Compound (H2) Having a Fraction of 45 Mol % of Primary Structural Units (I), and a Fraction of 55 Mol % of Bisalkoxysilylamine Structural Units (III), the Mol % Figures being Based in Each Case on the Entirety of the Structural Units (I) Plus (III), and Having a Degree of Conversion of the Isocyanate Groups of (HG) of c=100 Mol %

A three-neck glass flask equipped with a reflux condenser and a thermometer is charged with 30.83 parts of trimerized hexamethylene diisocyanate (HDI) (Desmodur® N3600, Bayer Material Science) and 19.96 parts of solvent naphtha. With nitrogen blanketing and stirring, at 20-30° C., a mixture of 32.17 parts of bis[3-(trimethoxysilyl)propyl]amine (Dynasylan® 1124, Degussa, Rheinfelden), and 17.03 parts of 3-aminopropyltriethoxysilane (Dynasylan® AMEO, Degussa, Rheinfelden) is metered in at a rate such that 40° C. is not exceeded. After the end of the metered addition, the reaction temperature is held at 20-30° C. Complete reaction of the isocyanate groups is ascertained by titration. The product is a transparent mass of high viscosity which is slightly clouded by air inclusions. The compound (H2) has a calculated nonvolatiles content of 80% by weight and an NCO content (solids) of 0% by weight.

Preparation of a Urea-Group-Containing Compound (HV2) Having Isocyanate Groups and Having a Fraction of 56 Mol % of Primary Structural Units (I), and a Fraction of 44 Mol % of Bisalkoxysilylamine Structural Units (III), the Mol % Figures being Based in Each Case on the Entirety of the Structural Units (I) Plus (III), and Having a Degree of Conversion of the Isocyanate Groups of (HG) of c=80 Mol %

A three-neck glass flask equipped with a reflux condenser and a thermometer is charged with 36.10 parts of trimerized hexamethylene diisocyanate (HDI) (Desmodur® N3600, Bayer Material Science) and 19.99 parts of solvent naphtha. With nitrogen blanketing and stirring, at 20-30° C., a mixture of 23.97 parts of bis[3-(trimethoxysilyl)propyl]amine (Dynasylan® 1124, Degussa, Rheinfelden), and 19.94 parts of 3-aminopropyltriethoxysilane (Dynasylan® AMEO, Degussa, Rheinfelden) is metered in at a rate such that 40° C. is not exceeded. After the end of the metered addition, the reaction temperature is held at 20-30° C. Reaction of the isocyanate groups is ascertained by titration. The product is a transparent mass of high viscosity which is slightly clouded by air inclusions. The compound (HV2) has a calculated nonvolatiles content of 80% by weight and an NCO content (solids) of 2.0% by weight.

Preparation of a Urea-Group-Containing Compound (H3) Having a Fraction of 35 Mol % of Primary Structural Units (I), a Fraction of 15 Mol % of Secondary Structural Units (II), and a Fraction of 50 Mol % of Bisalkoxysilylamine Structural Units (III), the Mol % Figures being Based in Each Case on the Entirety of the Structural Units (I) Plus (II) Plus (III), and Having a Degree of Conversion of the Isocyanate Groups of ($H_G$) of c=100 Mol %

A three-neck glass flask equipped with a reflux condenser and a thermometer is charged with 31.1 parts of trimerized hexamethylene diisocyanate (HDI) (Desmodur® N3600, Bayer Material Science) and 20 parts of solvent naphtha. With nitrogen blanketing and stirring, at 20-30° C., a mixture of 29.5 parts of bis[3-(trimethoxysilyl)propyl]amine (Dynasylan® 1124, Degussa, Rheinfelden), 6.1 parts of N-[-3-(trimethoxysilyl)propyl]butylamine (Dynasylan® 1189, Degussa, Rheinfelden), and 13.4 parts of 3-aminopropyltriethoxysilane (Dynasylan® AMEO, Degussa, Rheinfelden) is metered in at a rate such that 40° C. is not exceeded. After the end of the metered addition, the reaction temperature is held at 20-30° C. Complete reaction of the isocyanate groups is ascertained by titration. The product is a transparent mass of high viscosity which is slightly clouded by air inclusions. The compound (H3) has a calculated nonvolatiles content of 80% by weight and an NCO content (solids) of 0% by weight.

Preparation of a Urea-Group-Containing Compound (HV3) According to WO06/131314, with a Fraction of 100 Mol % of Primary Structural Units (I), the Mol % Figures being Based in Each Case on the Entirety of the Structural Units (I) Plus (II) Plus (III)

A three-neck glass flask equipped with a reflux condenser and a thermometer is charged with 13.10 parts of monomeric cycloaliphatic diisocyanate $H_{12}MDI$ (Desmodur W). With nitrogen blanketing and stirring, 22.10 parts of 3-aminopropyltriethoxysilane (Dynasylan®AMEO, Degussa, Rheinfelden) are metered in at a rate such that 50° C. is not exceeded. After the end of the metered addition, the reaction temperature is held at 20-30° C. This produces a very viscous mass which cannot be titrated. Further processing is therefore abandoned.

Preparation of a Urea-Group-Containing Compound (HV4) According to WO06/131314, with a Fraction of 100 Mol % of Primary Structural Units (I), the Mol % Figures being Based in Each Case on the Entirety of the Structural Units (I) Plus (II) Plus (III)

A three-neck glass flask equipped with a reflux condenser and a thermometer is charged with 28.80 parts of trimerized hexamethylene diisocyanate (HDI) (Desmodur® N3600, Bayer Material Science). With nitrogen blanketing and stirring, 35.36 parts of 3-aminopropyltriethoxysilane (Dynasylan AMEO, Degussa, Rheinfelden) are metered in at a rate such that 50° C. is not exceeded. After the end of the metered addition, the reaction temperature is held at 20-30° C. Complete blocking is ascertained by titration. This produces a very viscous mass which cannot be titrated. Further processing is therefore abandoned.

Preparation of a Urea-Group-Containing Compound (H4) Having a Fraction of 45 Mol % of Primary Structural Units (I), a Fraction of 55 Mol % of Secondary Structural Units (II), and a Fraction of 0 Mol % of Bisalkoxysilylamine Structural Units (III), the Mol % Figures being Based in Each Case on the Entirety of the Structural Units (I) Plus (II) Plus (III), and Having a Degree of Conversion of the Isocyanate Groups of ($H_G$) of c=100 Mol %

A three-neck glass flask equipped with a reflux condenser and a thermometer is charged with 30.8 parts of trimerized hexamethylene diisocyanate (HDI) (Desmodur® N3600, Bayer Material Science) and 16.0 parts of solvent naphtha. With nitrogen blanketing and stirring, at 20-30° C., a mixture of 20.7 parts of N-[-3-(trimethoxysilyl)propyl]butylamine (Dynasylan® 1189, Degussa, Rheinfelden), and 15.9 parts of 3-aminopropyltriethoxysilane (Dynasylan® AMEO, Degussa, Rheinfelden) is metered in at a rate such that 40° C. is not exceeded. After the end of the metered addition, the reaction temperature is held at 20-30° C. Complete reaction of the isocyanate groups is ascertained by titration. The compound (H4) has a calculated nonvolatiles content of 80% by weight and an NCO content (solids) of 0% by weight.

Preparation of a Urea-Group-Containing Compound (H5) Having a Fraction of 15 Mol % of Primary Structural Units (I), a Fraction of 35 Mol % of Secondary Structural Units (II), and za Fraction of 50 Mol % of Bisalkoxysilylamine Structural Units (III), the Mol % Figures being Based in Each Case on the Entirety of the Structural Units (I) Plus (II) Plus (III), and Having a Degree of Conversion of the Isocyanate Groups of ($H_G$) of c=100 Mol %

A three-neck glass flask equipped with a reflux condenser and a thermometer is charged with 31.0 parts of trimerized hexamethylene diisocyanate (HDI) (Desmodur® N3600, Bayer Material Science) and 20 parts of solvent naphtha. With nitrogen blanketing and stirring, at 20-30° C., a mixture of 28.0 parts of bis[3-(trimethoxysilyl)propyl]amine (Dynasylan® 1124, Degussa, Rheinfelden), 13.5 parts of N-[-3-(trimethoxysilyl)propyl]butylamine (Dynasylan® 1189, Degussa, Rheinfelden), and 5.3 parts of 3-aminopropyltriethoxysilane (Dynasylan® AMEO, Degussa, Rheinfelden) is metered in at a rate such that 40° C. is not exceeded. After the end of the metered addition, the reaction temperature is held at 20-30° C. Complete reaction of the isocyanate groups is ascertained by titration. The compound (H5) has a calculated nonvolatiles content of 80% by weight and an NCO content (solids) of 0% by weight.

Preparation of Different Mixtures (M1) to (M5) and (MV0) to (MV3) of the curing agent (B1) and the urea-Group-Containing Compounds (H1) to (H5) and (HV1) to (HV2)

In a wide-neck glass vessel (200 ml), 90 parts of the curing agent (B1) are mixed with 10 parts of each of the urea-containing compounds (H) indicated in table 3, with vigorous stirring using a KPG stirrer and paddle blade, for 3 hours.

TABLE 3

Composition in parts by weight and properties of the mixtures of curing agent
(B1) with the urea-group-containing compounds (H1) to (H5) and also (HV1) to (HV3)

| Mixture | MV0 | M1 | MV1 | M2 | MV2 | M3 | MV3 | M4 | M5 |
|---|---|---|---|---|---|---|---|---|---|
| B1 | 100.0 parts | 90.0 parts | 90.0 parts | 90.0 parts | 90.0 parts | 90.0 parts | | 90.0 parts | 90.0 parts |
| H1 | | 10.0 parts | | | | | | | |
| HV1 | | | 10.0 parts | | | | | | |
| H2 | | | | 10.0 parts | | | | | |
| HV2 | | | | | 10.0 parts | | | | |
| H3 | | | | | | 10.0 parts | | | |

TABLE 3-continued

Composition in parts by weight and properties of the mixtures of curing agent (B1) with the urea-group-containing compounds (H1) to (H5) and also (HV1) to (HV3)

| Mixture | MV0 | M1 | MV1 | M2 | MV2 | M3 | MV3 | M4 | M5 |
|---|---|---|---|---|---|---|---|---|---|
| HV3 | | | | | | | 100.0 parts | | |
| H4 | | | | | | | | 10.0 parts | |
| H5 | | | | | | | | | 10.0 parts |
| Visual assessment | homogeneous flowable | homogeneous flowable and structurally viscous | gel particles flowable and structurally viscous | homogeneous flowable and structurally viscous | gel particles flowable and structurally viscous | homogeneous flowable and structurally viscous | highly viscous, not miscible with B1 | homogeneous flowable and structurally viscous | homogeneous flowable, slightly structurally viscous |

Preparation of the Coating Compositions of Examples 1 to 5 and of Comparative Examples C1 to C3

From the components indicated in table 4, the clearcoats of inventive examples 1 to 5 and the clearcoats of comparative examples C1 to C3 are prepared by combining the components indicated in table 4 and stirring them together to produce a homogeneous mixture. In this case, the composition of the millbase component is indicated in table 2.

TABLE 4

Composition of the coating compositions of inventive examples 1 to 5 and of comparative examples C1 to C3, in parts by weight

| | Comp. ex. 1 | Example 1 | Comp. ex. 2 | Example 2 | Comp. ex. 3 | Example 3 | Example 4 | Example 5 |
|---|---|---|---|---|---|---|---|---|
| Millbase | 100 | 100 | 100 | 100 | 100 | 100 | 100 | 100 |
| MV0 | 75 | | | | | | | |
| M1 | | 75 | | | | | | |
| MV1 | | | 75 | | | | | |
| M2 | | | | 75 | | | | |
| MV2 | | | | | 75 | | | |
| M3 | | | | | | 75 | | |
| M4 | | | | | | | 75 | |
| M5 | | | | | | | | 75 |
| Nacure ® 4167 | 4.0 | 4.0 | 4.0 | 4.0 | 4.0 | 4.0 | 4.0 | 4.0 |
| Solids in % | 55 | 55 | 55 | 55 | 55 | 55 | 55 | 55 |

Key to table 4:
Nacure ® 4167 = catalyst based on amine-blocked phosphoric acid partial esters from King Industries, nonvolatiles content 25%

The materials are subsequently applied electrostatically in wedge format to coil panels already coated with a black, solid-color, commercial aqueous base coat material from BASF Coatings AG. Application takes place in two passes, the first by means of ESTA high-speed rotation and the second by means of pneumatic application. The parameters for the application of the respective clearcoats are as follows:

| | |
|---|---|
| Substrate | e.g., coil 500 cm × 200 cm |
| Test method | Constant |
| Bell | 33 type (DÜRR) |
| Nozzle | 1.3 mm |
| Atomizer (DÜRR) | ECO-Bell direct |
| Object distance/cm | 26 |
| Belt speed (m/min) | 2.7 |
| Lift height - top | 215 |
| Lift rate | 0.8 m/s |
| High voltage (kV) | 70 |
| Rotary speed (rpm) | 40 000 |
| Lift height - bottom | 115 |
| Guiding air (liters [stp]) | 240 |
| Pump setting | 55 (x6 = 330 ml) |
| Film thickness (μm) | Wedge 20 to 60 μm |
| Flash time (min) | 10 |
| Temperature/humidity | 23° C./65% |

In order to test the sagging propensity, a wedge with an increasing film thickness is produced. This is done by a vertical motion of the panel relative to the bell in the course of application. In order to induce sags, holes are made in the panel at defined intervals. The length of each sag, in mm, is determined as a function of the film thickness. As the sagging limit, 10 mm is assumed as a figure relevant to actual practice. Since the film built up totals only about 50 μm, discrete sag lengths are determined, and a linear function for the sag length verses film thickness is determined by regression. Extrapolation to a sagging limit of 10 mm produces the associated film-thickness figure. These film-thickness figures are reported in table 5. The films are all of optically excellent quality.

TABLE 5 extrapolated film-thickness figures for a sagging limit of 10 mm

| Example | Curing agent mixture | Extrapolated film-thickness figures in μm |
|---|---|---|
| Comp. ex. 1 | MV0 | 56 |
| Example 1 | M1 | 69 |
| Comp. ex. 2 | MV1 | not applied (gel particles) |
| Example 2 | M2 | 80 |
| Comp. ex. 3 | MV2 | not applied (gel particles) |
| Example 3 | M3 | 65 |
| Example 4 | M4 | 79 |
| Example 5 | M5 | 59 |

The results in table 5 show that using the inventive urea-containing compound (H1) or (H2) or (H3) or (H4) produces coating compositions having a significantly improved sagging propensity and using the inventive urea-containing compound (H5) produces coating compositions having a slightly improved sagging propensity. The inventive coatings obtained, in spite of the use of these urea-containing compounds (H1) or (H2) or (H3) or (H4) or (H5), are notable for very high transparency. Nor is there any impairment in the other properties of the coatings, such as scratch resistance and chemical resistance. The coating compositions of comparative examples MV1 and MV2, in contrast, could not be applied, owing to the formation of gel particles.

The invention claimed is:

1. A coating composition based on aprotic solvents, comprising at least one hydroxyl-containing compound (A), at least one isocyanato-containing compound (B), and at least one urea-group containing compound (H) different from the compound (B),
    wherein
    (i) the urea-group-containing compound (H) comprises at least one structural unit of the formula (I):

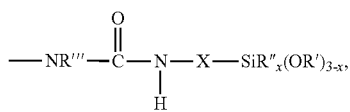

and at least one other structural unit, said other structural unit being selected from the group consisting of
    (a) at least one structural unit (II) of the following formula (II)

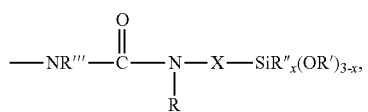

(b) at least one structural unit (III) of the following formula (III)

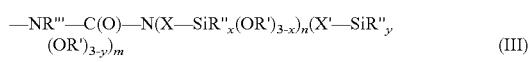

and
    (c) at least one structural unit (II) of the formula (II) and at least one structural unit (III) of the formula (III), and
    (ii) the urea-group-containing compound (H) is obtained by reacting an isocyanato-containing compound ($H_G$) with amino-containing compounds, and
    (iii) in the urea-group-containing compound (H) more than 90 mol % of the isocyanate groups originally present in the isocyanato-containing compound ($H_G$) have undergone reaction to form the structural units (I) and (II), or (I) and (III), or (I) and (II) and (III),
    wherein, in the formulae (I), (II), and (III)
    R'''=hydrogen, alkyl, cycloalkyl, aryl or aralkyl, it being possible for the carbon chain to be interrupted by non-adjacent oxygen, sulfur or NRa groups, with Ra=alkyl, cycloalkyl, aryl or aralkyl,
    R,R''=alkyl, cycloalkyl, aryl or aralkyl, it being possible for the carbon chain to be interrupted by nonadjacent oxygen, sulfur or NRa groups, with Ra=alkyl, cycloalkyl, aryl or aralkyl,
    R'=hydrogen, alkyl or cycloalkyl, it being possible for the carbon chain to be interrupted by nonadjacent oxygen, sulfur or NRa groups,
    X, X'=linear and/or branched alkyl or cycloalkyl radical having 1 to 20 carbon atoms,
    x=0 to 2, y=0 to 2, and n=0 to 2, m=0 to 2, and m+n=2.

2. The coating composition of claim 1, wherein the compound (H) has at least one structural unit of the formula (I), at least one structural unit of the formula (II) and at least one structural unit of the formula (III).

3. The coating composition of claim 2, wherein the compound (H) comprises from 10 and 60 mol %, based in each case on the entirety of the structural units (I), (II), and (III), of at least one structural unit of the formula (I), and the sum of the structural units (II) plus structural units (III) is between 90 and 40 mol %, based in each case on the entirety of the structural units (I), (II) and (III).

4. The coating composition of claim 1, wherein, in the compound (H), more than 95 mol %, of the isocyanate groups originally present have undergone reaction to form the structural units (I) and (II) or (I) and (III) or (I) and (II) and (III).

5. The coating composition of claim 1, wherein the compound (H) is prepared by reacting an isocyanato-containing compound ($H_G$) with a primary monoalkoxysilylamine (Ia) of the formula (Ia)

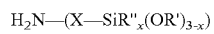

and
with a member selected from the group consisting of a secondary monoalkoxysilylamine (IIa) of the formula (IIa)

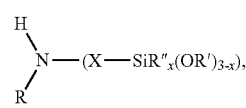

a bisalkoxysilylamine of the formula (IIIa)

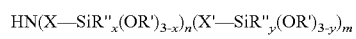

and combinations thereof,
where R, R', X, X', R'' x, y, m and n are as defined above.

6. The coating composition of claim 1, wherein the isocyanato-containing compound (HG) is an isocyanurate trimer of an aliphatic and/or cycloaliphatic diisocyanate.

7. The coating composition of claim 1, wherein the isocyanate-containing compound ($H_G$) is selected from the group consisting of 1,6-hexamethylene diisocyanate, 4,4'-methylenedicyclohexyl diisocyanate, the isocyanurate trimers of the aforementioned polyisocyanates, and combinations of the two or more of the foregoing.

8. The coating composition of claim 1, comprising from 1% to 20%, based in each case on the nonvolatile constituents of its component (B), of at least one urea-containing compound (H).

9. The coating composition of claim 1, wherein one or more constituents of the coating composition that are different from the compound (H) comprise at least one structural unit selected from the group consisting of a structural unit (IV) of the formula (IV)

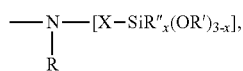  (IV)

a structural unit (V) of the formula (V)

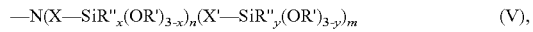  (V), and combinations of the foregoing, where R, R', X, X', R" x, y, m and n are as defined above.

10. The coating composition of claim 1, wherein at least part of the isocyanato-containing compound (B) has at least one structural unit of the formula (IV) and at least one structural unit of the formula (V).

11. The coating composition of claim 10, wherein, in the isocyanato-containing compound (B), between 0 and 90 mol % of the isocyanate groups in the polyisocyanate parent structure have undergone reaction to form structural units (IV) and/or between 0 and 90 mol % of the isocyanate groups in the polyisocyanate parent structure have undergone reaction to form structural units (V), and/or the total fraction of the isocyanate groups in the polyisocyanate parent structure that have undergone reaction to form the structural units (IV) and (V) is between 0 and 90 mol %.

12. The coating composition of claim 1, wherein the at least one hydroxyl-containing compound (A) comprises at least one poly(meth)acrylate polyol and/or at least one hydroxy-functional polyester in which on average at least one hydroxyl function of the polyester is esterified with at least one acid selected from the group of the isomeric C8 to C9 monocarboxylic acids.

13. A multistage coating method comprising applying a pigmented basecoat film to an optionally precoated substrate and thereafter applying a film of a coating composition as claimed in claim 1.

14. An effect and/or color paint system comprising at least one pigmented coating with a clearcoat disposed thereon, wherein the clearcoat has been produced from a coating composition as claimed in claim 1.

15. The method of claim 13 wherein the substrate is selected from automotive OEM finishing substrates, commercial vehicle finishing substrates, refinish substrates, bodywork component substrates, interior installation substrates, exterior installation substrates, and combinations of the foregoing.

* * * * *